US012723617B2

(12) United States Patent
Englebright

(10) Patent No.: US 12,723,617 B2
(45) Date of Patent: Sep. 1, 2026

(54) SOCKET JOINT BEARING

(71) Applicant: FEDERAL-MOGUL MOTORPARTS LLC, Northville, MI (US)

(72) Inventor: Seth Englebright, Festus, MO (US)

(73) Assignee: FEDERAL-MOGUL MOTORPARTS LLC, Northville, MI (US)

(*) Notice: Subject to any disclaimer, the term of this patent is extended or adjusted under 35 U.S.C. 154(b) by 307 days.

(21) Appl. No.: 18/659,369

(22) Filed: May 9, 2024

(65) Prior Publication Data

US 2025/0347316 A1 Nov. 13, 2025

(51) Int. Cl.
*F16C 11/06* (2006.01)

(52) U.S. Cl.
CPC .................................. *F16C 11/068* (2013.01)

(58) Field of Classification Search
CPC .. A61F 2002/30654; A61F 2002/30655; F16C 11/068; F16C 11/0685
See application file for complete search history.

(56) References Cited

U.S. PATENT DOCUMENTS 2,527,787 A * 10/1950 Berger ................ F16C 11/0628 403/138
2,701,151 A * 2/1955 Booth ..................... F16C 11/06 403/138
2,823,055 A * 2/1958 Booth ................. F16C 11/0676 280/124.141
2,971,787 A * 2/1961 Lincoln ............... F16C 11/0671 403/127
3,647,249 A * 3/1972 Baba et al. ......... F16C 11/0652 403/126
3,677,587 A * 7/1972 Schmidt .............. F16C 11/0638 403/140
4,231,673 A 11/1980 Satoh et al.
4,353,660 A * 10/1982 Parks .................. F16C 11/0685 403/135
4,695,181 A * 9/1987 Rahmede ............ F16C 11/0638 403/135
4,875,794 A * 10/1989 Kern, Jr. ............... F16C 11/086 29/898.044

(Continued)

FOREIGN PATENT DOCUMENTS

CH 355329 A 6/1961
CN 211525323 U 9/2020

(Continued)

*Primary Examiner* — Daniel J Wiley
(74) *Attorney, Agent, or Firm* — Reising Ethington P.C.

(57) ABSTRACT

A bearing for a socket joint incorporates an internal grease groove pattern which may help to interlock an outer shell portion that is also used as a preload. The bearing includes a first grease groove extends along an inner shell surface and a second grease groove extends along the inner shell surface. At least one of the first grease groove or the second grease groove extend between one or more of the end side and the exit side of the inner shell surface, and the first grease groove and the second grease groove at least partially intersect at a groove junction. In one implementation, one or more grease grooves at least partially follow a geodesic path, and in another implementation, one or more grease grooves fluidly cooperate with a grease channel located in an overhanging retention lip of an outer shell portion.

18 Claims, 4 Drawing Sheets

(56) References Cited

U.S. PATENT DOCUMENTS 4,904,106 A * 2/1990 Love .................... F16C 11/068 403/135
5,011,320 A * 4/1991 Love .................... F16C 11/068 403/140
5,116,159 A * 5/1992 Kern, Jr ............. F16C 11/0642 29/898.047
5,286,131 A * 2/1994 Wood ................. F16C 11/0647 403/138
5,368,408 A * 11/1994 Shimizu ............. F16C 11/0638 403/136
5,549,700 A 8/1996 Graham et al.
5,772,337 A * 6/1998 Maughan ........... F16C 11/0685 384/208
5,916,269 A * 6/1999 Serbousek ........... A61F 2/3859 623/22.24
6,164,861 A * 12/2000 Maughan ........... F16C 11/0638 403/135
6,660,040 B2 * 12/2003 Chan .................... A61F 2/3877 623/22.17
7,040,833 B2 5/2006 Kondoh
7,260,878 B2 8/2007 Musashi
7,661,902 B2 * 2/2010 Brunneke ............ F16C 33/122 403/143
7,985,034 B2 7/2011 Ruste et al.
8,061,921 B2 * 11/2011 Seol ................... F16C 11/0638 403/126
8,678,656 B2 * 3/2014 Richter ................ F16C 11/068 403/135
9,464,663 B2 10/2016 Belleau et al.
10,557,496 B2 * 2/2020 Lonergan, III ..... F16C 11/0628
10,711,830 B2 7/2020 Englebright et al.
10,844,900 B2 * 11/2020 Reddehase ........... F16C 11/068
11,053,972 B2 7/2021 Paerewyck et al.
11,542,981 B2 * 1/2023 Doherty ................ B60G 7/005
11,754,114 B2 * 9/2023 Kuroda ................. B60G 7/005 403/135
2007/0274770 A1 * 11/2007 Sagisaka ................ F16C 33/08 403/132
2014/0086667 A1 * 3/2014 Elterman ........... F16C 11/0633 29/428
2020/0191194 A1 * 6/2020 Gruber ............... F16C 11/0685
2020/0284291 A1 * 9/2020 Doherty ............. F16C 11/0628

FOREIGN PATENT DOCUMENTS

| | | | |
|---|---|---|---|
| DE | 10361289 | A1 | 7/2005 |
| DE | 102010029137 | A1 | 11/2011 |
| GB | 947759 | A | 1/1964 |
| JP | 2006300264 | A | 11/2006 |
| KR | 20010033396 | A | 4/2001 |
| KR | 20240028245 | A | 3/2024 |
| WO | WO2005066510 | A1 | 7/2005 |

* cited by examiner

SOCKET JOINT BEARING

TECHNICAL FIELD

This invention generally relates to vehicle components and, in particular, to socket joints used in steering and suspension systems.

BACKGROUND

Socket joints are oftentimes equipped with one or more bearings and a Belleville washer as a preload. Belleville washers are typically made from metal, which can be more expensive than other materials, such as plastic. The bearing of the present disclosure can incorporate an inner shell surface that is metal with an outer shell portion that is plastic. The outer shell portion may be structured so as to achieve an adequate preload without having to include a separate Belleville washer. The bearing may also include a particular grease groove structure that helps avoid a situation where the ball of the stud can move at least partially into the grease groove. Such jarring side-to-side movement or potential pinching of the stud can be undesirable.

SUMMARY

According to one embodiment, there is provided a bearing for a socket joint comprising an inner shell surface configured to at least partially contact a stud of the socket joint. The inner shell surface extends at least partially between an end side and an exit side. An outer shell portion is located at least partially radially outward with respect to the inner shell surface. A first grease groove extends along the inner shell surface and a second grease groove extends along the inner shell surface. At least one of the first grease groove or the second grease groove extend between one or more of the end side and the exit side of the inner shell surface, and the first grease groove and the second grease groove at least partially intersect at a groove junction along the inner shell surface.

In some embodiments, the inner shell surface is made of a metal-based material and the outer shell portion is made of a plastic-based material. The groove junction can define a side-mounted grease entry/exit point. An outer profile of the outer shell portion can be configured to at least partially conform to an internal bore of a housing, the outer profile having an axially extending surface and a radially extending surface. A first grease channel can be located at the axially extending surface, and a second grease channel can be located at the radially extending surface. The groove junction can be situated at the first grease channel.

In some embodiments, the outer shell portion has an overhanging retention lip configured to engage an edge extending from the inner shell surface. The overhanging retention lip can have a bearing surface that at least partially conforms to a curvature of the inner shell surface. In some implementations, a groove junction meets a grease channel in the overhanging retention lip, and the grease channel has a bi-material guide surface. The groove junction can have three or more offshoots and/or two or more offshoots that join at an edge of the inner shell surface.

In some embodiments, the first grease groove, the second grease groove, or both the first grease groove and the second grease groove at least partially follow a geodesic path. The first grease groove and the second grease groove can extend into the inner shell surface to form a reservoir side and a backside, with the backside of each grease groove interlocking the outer shell portion. A third grease groove can be included that at least partially intersects with the first grease groove and the second grease groove to form a plurality of groove junctions. A fourth grease groove can be included, with the first grease groove, the second grease groove, the third grease groove, and the fourth grease groove forming a lattice pattern.

In accordance with another embodiment, there is provided a bearing for a socket joint comprising an inner shell surface configured to at least partially contact a stud of the socket joint and an outer shell portion located at least partially radially outward with respect to the inner shell surface. The outer shell portion has an exit side and an end side. A grease groove has a reservoir side and a backside, with the grease groove at least partially following a geodesic path between a point on an edge of the exit side and a point on an edge of the end side. The reservoir side of the grease groove extends into the inner shell portion and the backside extends toward the outer shell portion so as to lock the outer shell portion with respect to the inner shell portion.

In accordance with another embodiment, there is provided a bearing for a socket joint comprising an inner shell surface configured to at least partially contact a stud of the socket joint. The inner shell surface has an edge. An outer shell portion is located at least partially radially outward with respect to the inner shell surface, the outer shell portion having an overhanging retention lip configured to engage the edge of the inner shell surface. The overhanging retention lip has a grease channel. The grease channel can be fluidly connected to one or more grease grooves in the inner shell surface.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

Figures 1, 2:
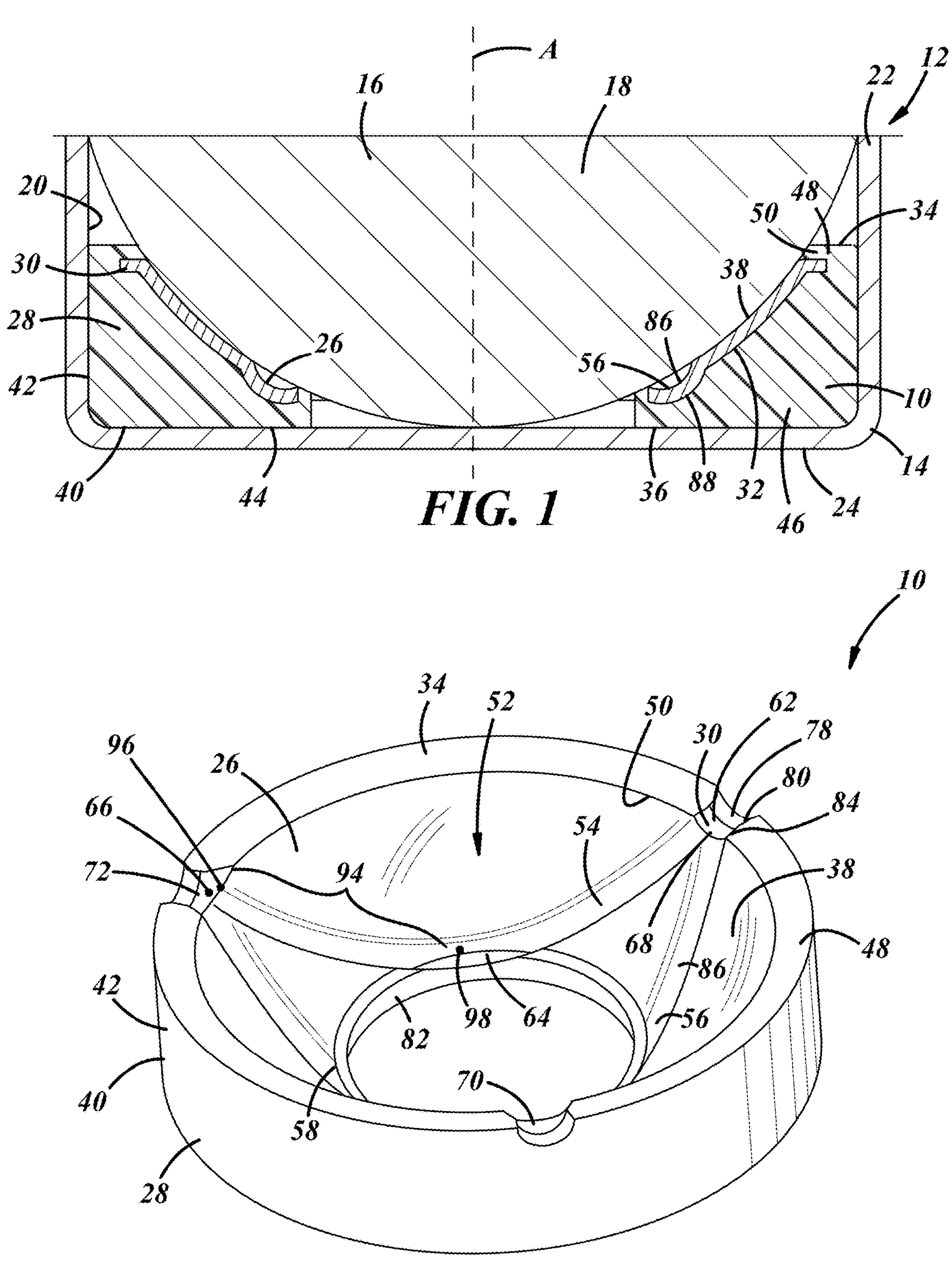
FIG. 1 is a partial, cross-sectional view of a socket joint having a bearing in accordance with one embodiment.
FIG. 2 is a perspective view of the bearing of FIG. 1.

The socket joint and bearing described herein can improve long-term performance by avoiding loading vectors that exist where the ball of the stud moves into one of the internal grease grooves of the bearing. Typical grease grooves in the bearing extend purely circumferentially or axially (circumferentially being like rings extending around the ball and axially being like umbrella seams extending down from the top of the ball). Additionally, in at least some embodiments, the bearing has an inner shell surface that is made of a metal-based material and an outer shell portion that is made of an elastomeric material. The outer shell portion can be configured to at least partially conform to an internal bore in the housing, thereby acting as a preload. With such an embodiment, a separate Belleville washer may not be needed, which can streamline manufacturing efforts and reduce the cost of the socket joint. This arrangement can also help manage stack up tolerances.

FIGS. 1-4 illustrate one embodiment a bearing 10 for a socket joint 12. The socket joint 12 includes a housing 14 at least partially surrounding a stud 16 having a ball 18 (although it is possible for the bearing 10 to be implemented in a socket joint where the stud does not have a ball). The housing 14 and/or stud 16 can include various threads, grooves, projecting portions, etc., beyond what is particularly illustrated. The socket joint 12 may also include other features that are not particularly illustrated, such as a cover plate, grease fitting, dust boot, or other operational-based features depending on the desired use and placement of the joint.

The socket joint 12 is advantageously used for an inner tie rod end. However, it is possible for the bearing 10 and the socket joint 12 to be used in other configurations or implementations, particularly those with less compression or tension. Other example embodiments include, but are not limited to, an outer joint, a follower joint, or using the bearing 10 as a backing or exit bearing, not in the location particularly shown in FIG. 1. Further, features relating to the bearing 10 may be useful in other joint applications, such as the illustrated and described grease groove configurations. Accordingly, it is possible to manufacture alternately configured suspension and/or steering components in accordance with the teachings herein. For example, the joint 12 may include any moveable socket configuration, and is not limited to the explicitly illustrated joint shown in the figures and described herein.

The housing 14 is a generally circular cylindrical component that surrounds the internal components of the joint 12. A central axis A of the joint 12 extends through the geometric center of a circle that is generally defined by the outer diameter of the housing 14 (with the internal components generally being coaxial with the housing, at least when the joint 12 is initially assembled). The housing 14 has an internal bore 20 in which the bearing 10 and the stud 16 are situated. Although not shown particularly in FIG. 1, the stud 16 is configured to exit the internal bore 20 at an exit side 22 of the housing 14, which is opposite the more particularly illustrated end side 24 of the housing 14.

The bearing 10 is situated within the internal bore 20 of the housing 14, adjacent the end side 24. Locating the bearing 10 in this position may be advantageous as it can act as a preload, potentially obviating the need for a separate Belleville washer or other preload component. The bearing 10 has an inner shell surface 26 configured to at least partially contact the stud 16 of the socket joint 12, as well as an outer shell portion 28 located at least partially radially outward with respect to the inner shell surface 26. The inner shell surface 26 has a radius of curvature that generally mimics or follows a radius of curvature of the ball 18 and generally serves as a bearing surface for the stud 16.

In this embodiment, a radially extending edge 30 extends from the inner shell surface 26, which can help with retention and overmolding for the outer shell portion 28. The radially extending edge 30 may be located at other axial locations along the radially outward side 32 of the inner shell surface 26 (e.g., a plurality of rib like structures extending radially from the radially outward side 32). In this embodiment, the radially extending edge 30 is located at an end side 34 of the bearing 10, which is opposite the exit side 36 of the bearing. Additionally, a radially inward side 38 is located opposite the radially outward side 32 and serves as the main bearing surface for the inner shell surface 26. As used herein, axial or axially extending means generally parallel to the axis A (+/−5 deg.), and radial or radially extending means generally orthogonal with respect to the axis A (+/−5 deg.). For components, surfaces, etc. that are described as radially or axially extending, only a portion thereof need to be radially or axially extending, respectively.

In this embodiment, the inner shell surface 26 and the outer shell portion 28 are made of different materials. More particularly, the inner shell surface 26 can be made of a metal-based material such as steel, to cite one operable example, but other materials for the inner shell surface 26 and the bearing 10 are certainly possible. In the embodiments illustrated in FIGS. 1-4, the outer shell portion 28 is made of a plastic-based polymeric material, such as a polyester alloy (e.g., VANDAR 2100 PBT), to cite one example. This particular material can help manage stack up tolerances and act as a preload, but other materials are possible and may be varied depending on manufacturing methods and/or the load requirements of the joint 12 assembly. The bi-material configuration of the bearing 10 can help maintain a more structurally sound inner shell surface 26 while providing a more tolerant material to help act as a preload for the outer shell portion 28.

As shown in FIG. 1, in the illustrated implementation, the outer shell portion 28 has an outer profile 40 which is configured to at least partially conform to the internal bore 20 of the housing 14. The outer profile 40 has an axially extending surface 42 and a radially extending surface 44, each of which directly contacts the internal bore 20 of the housing 14. It is possible for the outer profile 40 to not completely contact the internal bore 20 of the housing 14. For example, a chamfer or the like could be located between the axially extending surface 42 and the radially extending surface 44. The outer profile 40 in this embodiment also includes a puck-like end side projection 46 that provides an additional volume of material between the inner shell surface 26 and the end side 24 of the housing 14. This can help with preload capabilities.

The outer shell portion 28 includes an overhanging retention lip 48 configured to engage the radially extending edge 30 of the inner shell surface 26. The overhanging retention lip 48 almost fully encapsulates the edge 30 so as to help retain the two subcomponents of the bearing 10 together. The overhanging retention lip 48 provides supplemental axial retention to the inner shell surface 26 so as to act as an additional mechanical interlock between the inner shell surface and the outer shell portion 28. The overhanging retention lip 48 also includes a bearing surface 50 that at least partially conforms to a curvature of the inner shell surface 26, as shown more particularly in FIGS. 1, 3, and 4. The bearing surface 50 is generally contiguous with the radially inward side 38 of the inner shell surface 26 so as to provide adequate space for the ball 18 of the stud 16.

The inner shell surface 26 has an internal groove pattern 52 on the radially inward side 38 that facilitates additional grease distribution around the internal components of the socket joint 12, particularly between the bearing 10 and the stud 16. With reference to the embodiment of FIGS. 1-4, the internal groove pattern 52 includes a first grease groove 54, a second grease groove 56, and a third grease groove 58. Less or more grease grooves are possible, such as the embodiment of FIG. 5 which includes a fourth grease groove 160 (with like reference numerals in FIGS. 5-10 connoting like features). Three to five grooves are typically preferred so as to facilitate grease distribution while maximizing contact surface area on the radially inward side 38. The discussion herein focuses on the three grease grooves 54, 56, 58, and more particularly the grease groove 54 of the first embodiment, but it should be understood that these teachings may be applicable to other grooves formed in the bearing 10, or there may be alternately configured grooves that do not follow the particular structure of the internal groove pattern 52. For example, the bearing 10 could include other shorter grooves, alternately shaped grooves, slots, dimples, or other operable features.

With particular reference to the groove 54 (yet applicable to the other grooves but only labeled with respect to groove 54 for clarity purposes), there is a plurality of edge exits 62, 64, 66. These edge exits 62, 64, 66 occur where the groove 54 meets either one or both of the end side 34 and/or exit side 36. The edge exits 62, 64, 66 allow for enhanced grease flow between the bearing 10 and the ball 18. In this embodiment, each groove 54 has an edge exit 62 at the exit side 36, as well as an edge exit 64 at the end side 34 (at the midpoint of the groove path), and an edge exit 66 at the exit side 36. Accordingly, the grease groove 54 spans between two separate locations along the exit side 36, with its midpoint intersecting with the end side 34. In other embodiments, the groove 54 may span solely between two locations on the end side 34, between two locations on the exit side 36, or only between the end side 34 and the exit side 36, to cite a few examples.

Figure 5:
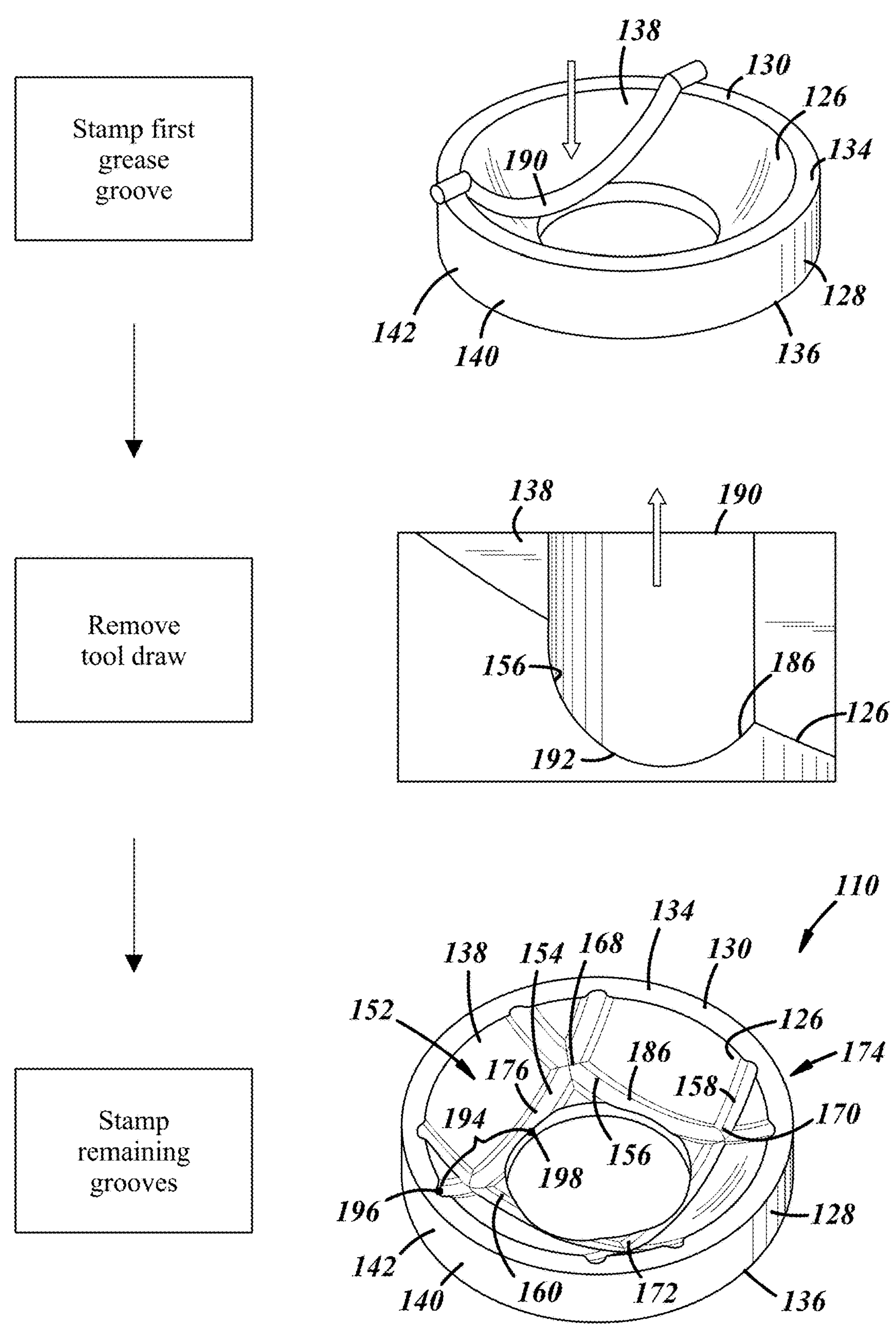
FIG. 5 schematically shows an example manufacturing method that may be used to manufacture a bearing in accordance with the present disclosure.
Figure 6:
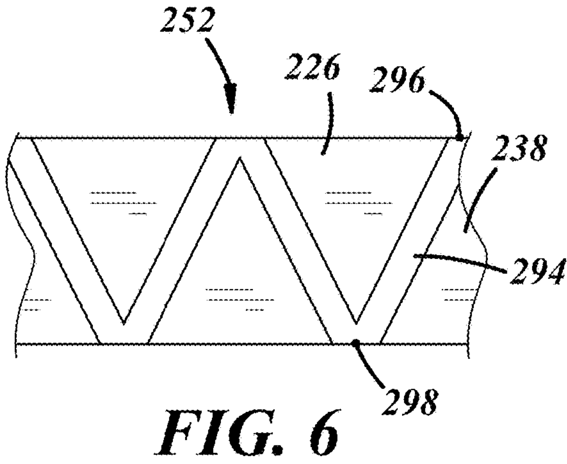
FIG. 6 is a partial view of one example internal groove pattern that may be used with a bearing.
Figure 7:
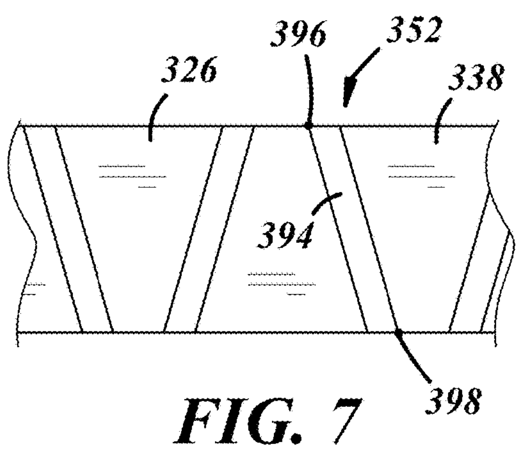
FIG. 7 is another partial view of an example internal groove pattern that may be used with a bearing.
Figure 8:
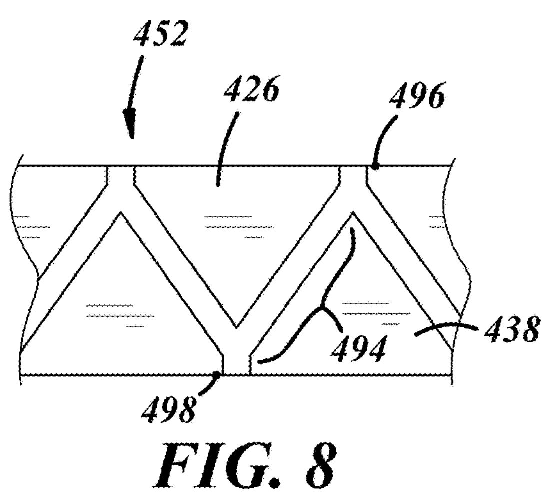
FIG. 8 is another partial view of an example internal groove pattern that may be used with a bearing.
Figure 9:
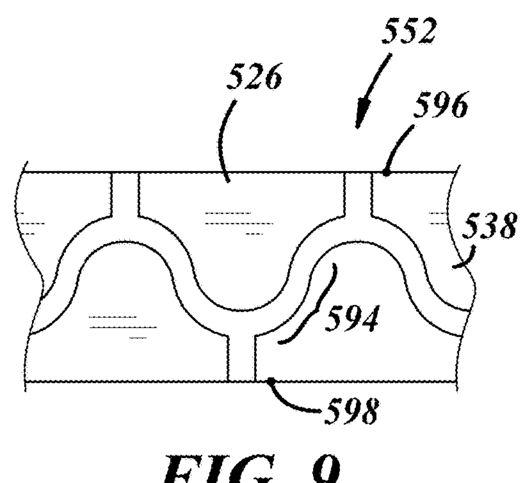
FIG. 9 is another partial view of an example internal groove pattern that may be used with a bearing.
Figure 10:
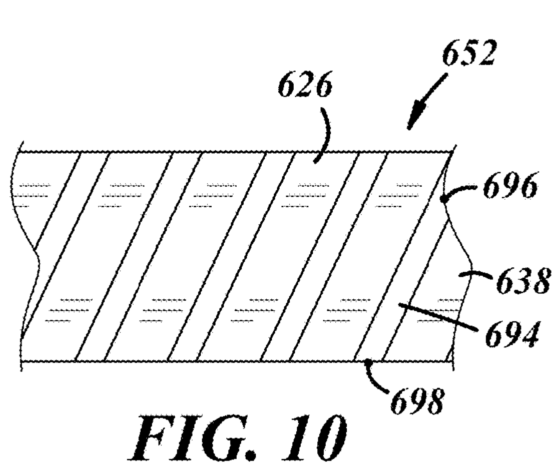
FIG. 10 is another partial view of an example internal groove pattern that may be used with a bearing.

In an advantageous embodiment, two or more of the grease grooves 54, 56 at least partially intersect at a groove junction 68. The embodiment of FIGS. 1-4 also includes a second groove junction 70 and a third groove junction 72 (intersection of grooves 56, 58 and grooves 54, 58, respectively). In this embodiment, each groove junction, with particular reference to the groove junction 68, includes two offshoots from each of the grease grooves 54, 56. In the embodiment of FIG. 5, however, with a lattice pattern 174 for the internal groove pattern 152, each groove junction has four offshoots (this is at least partially because each groove junction is spaced from either side 134, 136 instead of joining at one or more sides 34, 36 as shown in the embodiment of FIGS. 1-4). Additionally, since the embodiment of FIG. 5 includes a fourth grease groove 160, there is a corresponding fourth grease junction 176. Each groove junction is configured to provide a divergent grease path, which can provide more fluid flow options around the ball 18.

Figures 3, 4:
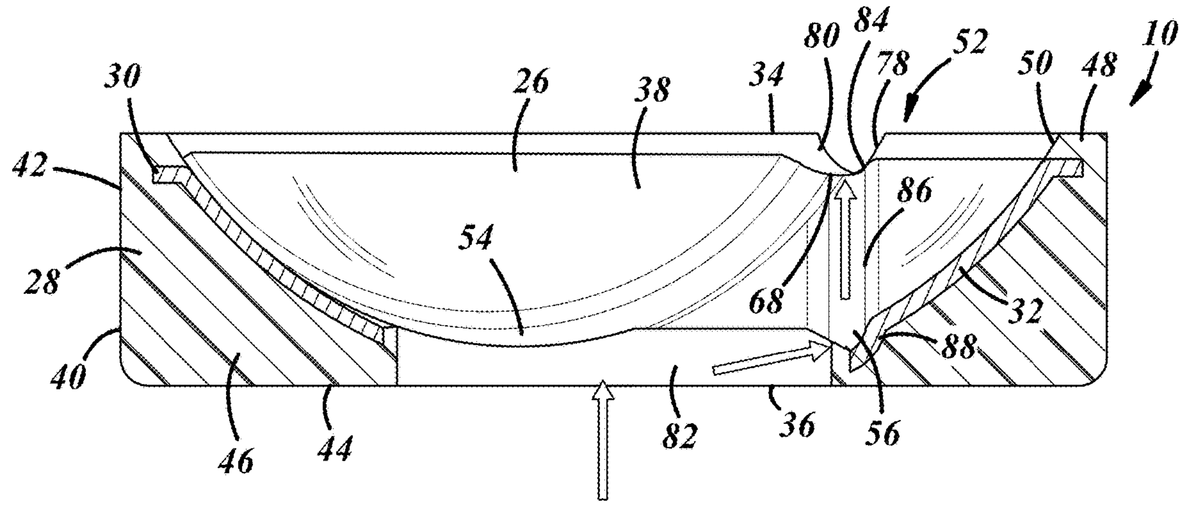
FIG. 3 is a cross-sectional view of the bearing of FIGS. 1 and 2.
FIG. 4 is another cross-sectional view of the bearing of FIGS. 1-3.

As shown schematically in FIGS. 3 and 4, the bearing 10 includes one or more side-mounted grease entry/exit points 78. The side-mounted grease entry/exit point 78 includes a radially extending grease channel 80. The radially extending grease channel 80 extends radially from the inner shell surface 26 at the exit side 36 out to the axially extending surface 42 of the outer shell portion 28 (this embodiment also includes two other radially extending grease channels at each groove junction 70, 72). A second grease channel 82 is an axially extending grease channel that is situated at the end side 34 of the inner shell surface 26 and extends through the outer shell portion 28 and opens at the radially extending surface 44. In this embodiment, the grease channels 80, 82 are located in the outer shell portion 28, whereas the grease grooves 54, 56, 58 are located in the inner shell surface 26.

As illustrated, cooperation between the grease channels 80, 82 and the grease grooves 54, 56, 58 help provide efficient grease transfer around the bearing 10. Advantageously, the bearing 10 provides a plurality of flow paths, which can make the socket joint 12 more viable in a variety of different applications. As shown in FIG. 3, grease may be introduced through the axially extending grease channel 82, which is fluidly connected to the grease groove 56 and can travel to groove junction 68. With reference to FIG. 4, it is also feasible to introduce grease through the radially extending grease channel 80 at the side mounted grease entry/exit point 78. Grease can then travel through the grease grooves 54, 56 and out the axially extending grease channel 82. This bidirectional flow feasibility can enhance the usability of the socket joint 12 in various implementations. This is at least partially attributable to the radially extending grease channels 80 joining each respective groove junction 68, 70, 72, and the axially extending grease channel 82 joining along each respective groove 54, 56, 58.

In the embodiment of FIGS. 1-4, the grease channel 80 is located in the overhanging retention lip 48 of the outer shell portion 28. As illustrated, this embodiment includes a plurality of radially extending grease channels, with only the grease channel 80 labeled for clarity purposes. Each grease channel 80 includes a bi-material guide surface 84. In this particular implementation, grease travels along a U-shaped plastic portion and a U-shaped metal portion of the grease channel 80. Having this arrangement helps to facilitate improved grease entry/exit while maximizing structure for the overhanging retention lip 48 to retain the inner shell surface 26 with respect to the outer shell portion 28.

To further help with retention between the inner shell surface 26 and the outer shell portion 28, each groove 54, 56, 58 includes a reservoir side 86 and a backside 88 (labeled with respect to groove 56 yet applicable to other grooves). The reservoir side 86, which is spaced from the radially inward side 38 of the inner shell surface 26, provides area for grease travel between the bearing 10 and the ball 18. The backside 88 projects outward away from the ball 18 which can help mechanically interlock the outer shell portion 28 and improve the retention between the components of the bearing 10.

FIG. 5 schematically illustrates one embodiment of manufacturing the bearing 110. As shown in this example, the internal groove pattern 152 is stamped into the inner shell surface 126. Also in this embodiment, the inner shell surface 126 and the outer shell portion 128 are one integral, metal component instead of having the bi-material structure illustrated in FIGS. 1-4. With the FIG. 1-4 embodiment, the inner shell surface 126 can be stamped as illustrated in FIG. 5, but then insert molded or the like to overmold the outer shell portion 28 around the inner shell surface. In FIG. 5, each groove 154, 156, 158, 160 is individually stamped, but it is also possible to implement tooling in which the entirety of the internal groove pattern 152 is stamped or formed at once. As illustrated, the tool draw 190 has an angularly truncated U-shape profile 192 which imparts the same shape to the reservoir side 186 of the groove 156 (angularly truncated U-shape generally meaning that the branches of the U have different lengths). Other manufacturing methods beyond those particularly illustrated or described are certainly possible.

FIGS. 6-10 illustrate various internal groove patterns 252, 352, 452, 552, 652 that may be used with different bearing implementations. In an advantageous embodiment, one or more grooves in each of the internal groove patterns 52, 152, 252, 352, 452, 552, 652 at least partially follows a geodesic path 94, 194, 294, 394, 494, 594, 694 between points 96, 98 (as well as 196, 198; 296, 298; 396, 398; 496, 498; 596, 598; 696, 698, respectively), with one point 96 located at the exit side 36 and one point 98 located at the end side 38. The portion that follows the geodesic path is advantageously ¼ or more of the length of the groove. "Geodesic" as used herein means the shortest possible line/curve between two points on the inner shell surface. In at least some embodiments in which the points 96, 98 are both located within the groove 54, the path is fully geodesic, not just partially geodesic. In a further advantageous embodiment, the geodesic paths 94, 194, 294, 394, 494, 594, 694 are non-axial geodesic paths. This arrangement is distinguishable from purely radially extending grooves that encircle the inner shell surface or more umbrella like grooves that would theoretically join at the end side 24 near the top of the ball 18. In these embodiments, the ball could get stuck in one of the grooves, which is less likely with a non-axial geodesic path.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A bearing for a socket joint, comprising:
- an inner shell surface configured to at least partially contact a stud of the socket joint, the inner shell surface extending at least partially between an end side and an exit side;
- an outer shell portion located at least partially radially outward with respect to the inner shell surface;
- a first grease groove extending along the inner shell surface;
- a second grease groove extending along the inner shell surface, wherein at least one of the first grease groove or the second grease groove extend between one or more of the end side and the exit side of the inner shell surface, and wherein the first grease groove and the second grease groove at least partially intersect at a groove junction along the inner shell surface; and
- a third grease groove that at least partially intersects with the first grease groove and the second grease groove to form a plurality of groove junctions.

2. The bearing of claim 1, wherein the inner shell surface is made of a metal-based material and the outer shell portion is made of a plastic-based material.

3. The bearing of claim 1, wherein the groove junction defines a side-mounted grease entry/exit point.

4. The bearing of claim 1, wherein an outer profile of the outer shell portion is configured to at least partially conform to an internal bore of a housing, the outer profile having an axially extending surface and a radially extending surface.

5. The bearing of claim 1, wherein the outer shell portion has an overhanging retention lip configured to engage an edge extending from the inner shell surface.

6. The bearing of claim 5, wherein the groove junction meets a grease channel in the overhanging retention lip.

7. The bearing of claim 6, wherein the grease channel has a bi-material guide surface.

8. The bearing of claim 1, wherein the groove junction has three or more offshoots.

9. The bearing of claim 1, wherein the groove junction has two or more offshoots that join at an edge of the inner shell surface.

10. The bearing of claim 1, wherein the first grease groove, the second grease groove, or both the first grease groove and the second grease groove at least partially follow a geodesic path.

11. The bearing of claim 1, wherein the first grease groove and the second grease groove extend into the inner shell surface to form a reservoir side and a backside, wherein the backside of each grease groove interlocks the outer shell portion.

12. The bearing of claim 1, comprising a fourth grease groove, wherein the first grease groove, the second grease groove, the third grease groove, and the fourth grease groove form a lattice pattern.

13. A socket joint comprising the bearing of claim 1.

14. A bearing for a socket joint, comprising:
- an inner shell surface configured to at least partially contact a stud of the socket joint, the inner shell surface extending at least partially between an end side and an exit side;
- an outer shell portion located at least partially radially outward with respect to the inner shell surface;
- a first grease groove extending along the inner shell surface; and
- a second grease groove extending along the inner shell surface, wherein at least one of the first grease groove or the second grease groove extend between one or more of the end side and the exit side of the inner shell surface, and wherein the first grease groove and the second grease groove at least partially intersect at a groove junction along the inner shell surface, wherein an outer profile of the outer shell portion is configured to at least partially conform to an internal bore of a housing, the outer profile having an axially extending surface and a radially extending surface, and wherein a first grease channel is located at the axially extending surface, and a second grease channel is located at the radially extending surface.

15. The bearing of claim 14, wherein the groove junction is situated at the first grease channel.

16. A socket joint comprising the bearing of claim 5.

17. A bearing for a socket joint, comprising:

an inner shell surface configured to at least partially contact a stud of the socket joint, the inner shell surface extending at least partially between an end side and an exit side;

an outer shell portion located at least partially radially outward with respect to the inner shell surface;

a first grease groove extending along the inner shell surface; and a second grease groove extending along the inner shell surface, wherein at least one of the first grease groove or the second grease groove extend between one or more of the end side and the exit side of the inner shell surface, and wherein the first grease groove and the second grease groove at least partially intersect at a groove junction along the inner shell surface, wherein the outer shell portion has an overhanging retention lip configured to engage an edge extending from the inner shell surface, and wherein the overhanging retention lip has a bearing surface that at least partially conforms to a curvature of the inner shell surface.

18. A socket joint comprising the bearing of claim 17.

* * * * *